Figure 1:
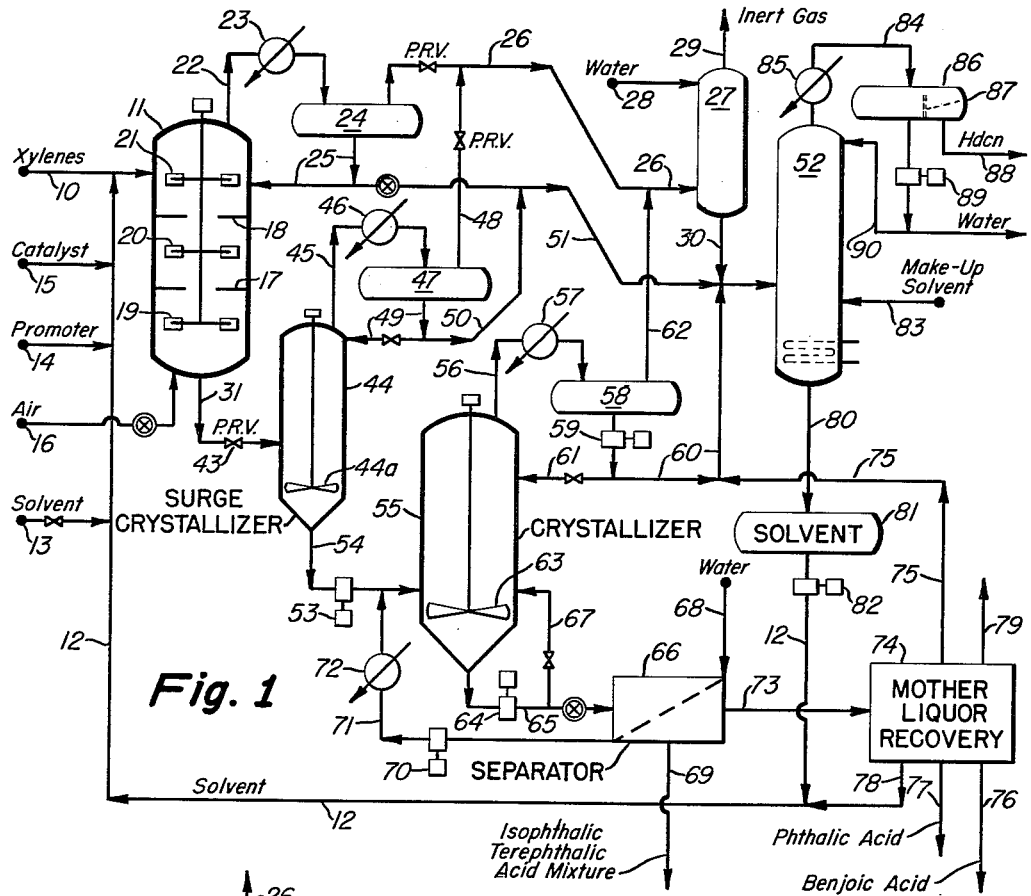

United States Patent Office 3,092,658
Patented June 4, 1963

3,092,658
CONTINUOUS SYSTEM FOR OXIDIZING SUBSTITUTED AROMATIC HYDROCARBONS AND PRODUCING CARBOXYLIC ACIDS
Richard H. Baldwin, Chicago, Ill., Charles A. Spiller, Jr., Maplewood, N.J., and Charles D. Kalfadelis, Hammond, Ind., assignors to Standard Oil Company, Chicago, Ill., a corporation of Indiana
Filed Aug. 12, 1957, Ser. No. 677,594
6 Claims. (Cl. 260—524)

This invention relates to an improved oxidation system for producing at least one carboxylic acid product from an aromatic charging stock having at least one, and preferably two or more, oxidizable substitutents. The invention will be described as applied to a system for producing phthalic acid and a mixture of isophthalic and terephthalic acids, respectively, from mixed xylenes.

It is known that aromatic hydrocarbons having at least one, and preferably two or more, oxidizable substituents may be converted into carboxylic acid products by effecting the oxidation under carefully controlled conditions in the presence of a suitable solvent such as a monobasic aliphatic acid reaction medium of 2 to 6 carbon atoms such, for example, as acetic acid, and also in the presence of known oxidation catalysts such as manganese and/or cobalt, preferably in the form of soluble carboxylic acid salts, and also in the presence of a bromine-affording material. The desirability of effecting such oxidation in a continuous manner has been recognized but heretofore no one has succeeded in developing such a continuous process on a commercial scale. The object of this invention is to provide an improved commercial oxidation system which is sufficiently flexible so that it may be employed for oxidizing a wide variety of charging stocks but which is particularly suitable for converting mixed xylenes to mixed dicarboxylic acids in such a form that they may be readily separated into substantially pure phthalic acid (or anhydride), isophthalic acid, and terephthalic acid, respectively. A particular object is to provide a stagewise continuous countercurrent oxidation system which will avoid explosion hazards and result in the attainment of product quality and yields comparable or even superior to those attainable in batch processes. A further object is to provide an integrated system for handling and removing water produced in the oxidation steps and for utilizing the solvent or acid reaction medium most effectively. Still another object is to provide an improved crystallization and recovery system which minimizes the necessity of using vacuum equipment and enables preparation and separation of mixed isophthalic and terephthalic acid crystals and separate recovery of phthalic acid (or anhydride) and perhaps benzoic acid from mother liquor. Other objects will be apparent as the detailed description of the invention proceeds.

In practicing the invention the aromatic charging stock which preferably has two or more oxidizable substituents may be introduced into the upper part of a continuous multistage oxidation system into which are also introduced about 1 to 5 volumes of a solvent such as a monobasic aliphatic acid reaction medium having 2 to 6 carbon atoms per molecule (preferably acetic acid), oxidation catalyst, a bromine-affording substance as hereinafter described. The oxygen-containing gas may be introduced into the countercurrent system at the opposite end from that at which charging stock is introduced. In some cases it may be possible to effect the countercurrent oxidation in a single vessel provided with a plurality of intermediate mixing stages, the heat of reaction being removed by boiling reaction medium and water from the vessel, condensing withdrawn vapors and returning the condensate. The oxygen concentration in the withdrawn gasiform stream, particularly in the condenser and in the receiver, should not exceed about 8 to 9 percent in order to avoid possible explosion hazards; the countercurrent system is particularly advantageous in that it enables practically quantitative oxygen utilization with minimum hazard and without substantial detriment to product yield or quality.

For most effective countercurrent contacting a plurality of oxidation vessels are employed in series, the highest oxygen concentration (e.g. air or oxygen-enriched air) being introduced at the final stage, the off-gases from each stage being returned to the preceding stage while the partially oxidized products move from the first stage to the final stage. In such systems the amount of oxygen in gases leaving each and all of the stages must be below about 8 percent and sufficient air is introduced into the gas stream which is passed into the earlier stages to supply the amount of oxygen required therein. It is desirable that the final oxidation stage be at the highest temperature, pressure and oxygen concentration, and it is also desirable that the amount of water in the acid medium should not substantially exceed about 20 volume percent. While for optimum yields and product quality it is desirable to minimize the amount of water in the final oxidation stage, it has been found that remarkably complete conversion into high quality product can be attained in systems wherein the solvent, such as acetic acid, is not less than about 80 percent in the final stage. In a staged three vessel countercurrent oxidation system the first stage should be operated at 50–300, e.g. 175 p.s.i., 320–420, e.g. 375° F., with a 1:1 to 5:1 acetic acid to hydrocarbon ratio and for a time of about .1 to 1 hour, e.g. 30 minutes. The second stage should be at a higher pressure than the first, i.e. 100–400 or about 300 p.s.i., at approximately the same temperature, e.g. 340–420 or about 380° F., with about the same solvent ratio and contact time as the first stage but preferably with a somewhat higher oxygen concentration. The last stage should be at the highest pressure, e.g. 200–500 or about 400 p.s.i., the highest temperature, e.g. 360–440 or about 400° F., and at the highest oxygen concentration, preferably air at the inlet side but in amounts to avoid exceeding 8 percent oxygen in the off-gas therefrom.

The oxidation product from the final stage is introduced into at least one, and preferably two or more, crystallizing zones, the first of which may act as a surge chamber if oxidized product is being discharged from one reactor while oxidation is being effected in one or more other reactors. The crystallization immediately preceding crystal separation is preferably effected at a pressure of about 1 to 2 p.s.i.g. and at a temperature of about 240 to 250° F.; this temperature should be sufficiently high to avoid crystallization of phthalic acid so that the latter may be obtained in relatively pure state from mother liquor. Adhering mother liquor is removed from isophthalic and terephthalic acids by a water wash in the separation stage and these two phthalic acids may thereafter be separated from each other by various techniques. Gasiform and aqueous solvent streams are produced in various parts of the system and it is important that an integrated system be provided for handling them most effectively.

Figure 2:
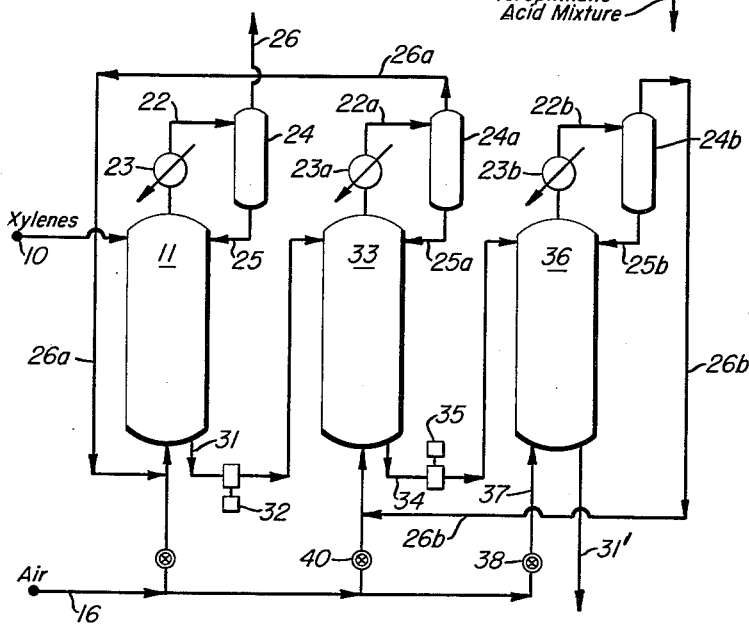

Additional aspects of the invention will be apparent from the following detailed description of a specific example thereof read in conjunction with the accompanying drawings which form a part of this specification and in which:

FIGURE 1 is a schematic flowsheet of our improved system for producing phthalic acids from mixed xylenes, and FIGURE 2 is a diagrammatic representation illustrating a continuous multi-vessel stage-countercurrent oxidation system which may advantageously be employed in the system of FIGURE 1.

The invention will be described as applied to the conversion of about 6000 pounds per hour of a mixed xylene charging stock to above 7500 pounds per hour of mixed dicarboxylic acids and about 500 pounds per hour of benzoic acid. The mixed xylene charge is introduced by line 10 to oxidizing vessel 11 at the rate of about 14 gallons per minute. The oxidizing vessel illustrated in FIGURE 1 diagrammatically illustrates a staged countercurrent oxidizing system which is described in further detail in FIGURE 2. Acetic acid of at least about 95 percent concentration is introduced through line 12 and any required make-up acetic acid may be introduced through line 13, the total acid introduction in this example being at the rate of about 20 gallons per minute. If make-up acetic acid contains appreciable amounts of water or other impurities, it is preferably introduced into a solvent fractionating still downstream in the system as will be later described. About 17 pounds per hour of ammonium bromide is introduced by line 14 and about 45 pounds per hour of manganese acetate is introduced in solution through line 15. Air is introduced through line 16 at the rate of about 7650 standard cubic feet per minute.

No novelty is claimed per se in the catalyst or in the catalyst promoter employed in this invention since the invention is an improvement in a particular promoted catalyst system recently perfected by others. The catalyst is a multi-valent or heavy metal, preferably in a form which is soluble in the reaction medium or solvent. The catalyst metal may advantageously be selected from the group consisting of manganese, cobalt, nickel, chromium, vanadium, molybdenum, tungsten, tin, cerium, or mixtures thereof, and the metal may be employed in elemental, combined, or ionic form, preferably in the form of acetate when the reaction medium or solvent is acetic acid. The promoter is a substance-affording bromine, the bromine being in elemental, ionic, organic or inorganic form. Thus the bromine may be employed in the form of potassium bromate, ammonium bromide, benzyl bromide, tetrabromoethane, manganese bromide or the like. The proportions of catalyst and promoter may be approximately stoichiometric as exemplified by manganese bromide and generally are in the range of 1:10 to 10:1 atoms of catalyst metal per atom of bromine. The amount of catalyst employed is usually in the range of about .01 to 10 percent or more and is preferably in the range of about .2 to 2 percent by weight based on aromatic hydrocarbon reactant charged. The preferred mixed metal catalysts are mixtures of manganese in the form of bromide or acetate with ammonium molybdate, ammonium chromate, tungstic acid, cobalt acetate, or the like, the proportions usually being about 1 to 2 parts by weight of manganese salt per part by weight of the other metal compound. Alternatively, of course, the catalyst metals may be employed as salts of an acid which is being produced in the system.

It may be possible to effect the desired oxidation countercurrently in a single oxidizing vessel, particularly if the vessel is divided into a plurality of zones by baffles 17 and 18 and provided with impeller type mixers 19, 20 and 21 in the three zones. Oxygen-depleted gas and vapors are withdrawn from the top of the oxidizing vessel through line 22 to cooler or condenser 23 and thence to receiver 24, the condensate being returned preferably by gravity feed through line 25 to the oxidizing vessel and the uncondensed gas being introduced by line 26 at the base of absorber 27 wherein it is scrubbed with about 560 pounds per hour of water introduced through line 28 for recovering acetic acid from insert gas which is vented to the atmosphere through line 29. Acid-containing water is withdrawn from absorber 27 through line 30.

For best results at least two, and preferably three, separate oxidizing vessels are employed as illustrated in FIGURE 2. The liquid charging stock, reaction medium, catalyst and bromine-affording material are introduced by line 10 to the first vessel 11 and the partially oxidized product which is withdrawn from the first vessel through line 31 is introduced by pump 32 to the upper part of second oxidizing vessel 33. Similarly, the incompletely oxidized product leaving vessel 33 by line 34 is introduced by pump 35 to final oxidizing tower 36. In this multi-vessel system air or oxygen-enriched air may be introduced at the base of the final vessel 36 through line 37, the amount of oxygen thus introduced being controlled by valve 38 to maintain an oxygen content in the off-gases from vessel 36 below about 8 volume percent. In this example each of the separate oxidizing vessels is provided with its individual vapor outlet conduit, cooler, receiver and liquid return line. Thus inert gas and vapors are withdrawn from vessel 36 by line 26b through cooler 23b and receiver 24b, condensate being returned by line 25b and vapors being withdrawn through line 26b. The gas phase in 23b, 24b and 26b should contain less than 8 percent oxygen and control valve 38 is regulated to prevent the oxygen concentration from exceeding the flammable limit.

The oxidizing gas introduced at the base of vessel 33 may be largely the free oxygen contained in the total gas stream which is introduced by line 26b directly into the base of vessel 33. Additional air or oxygen may be introduced through line 39 in amounts controlled by valve 40, this last named valve regulating the amount of introduced air or oxygen in order to prevent the oxygen concentration in receiver 24a or condenser 23a or line 26a from exceeding 8 volume percent. The total gas stream from line 26a is introduced at the base of reactor 11 for supplying oxidizing gas thereto and, here again, additional air or oxygen may be introduced through line 41 in amounts controlled by valve 42 for preventing the oxygen concentration in receiver 24, condenser 23 or line 26 from exceeding 8 volume percent (it is preferably zero). In this particular example vessel 11 is operated at about 160 p.s.i.g. and 375° F., vessel 33 at about 300 p.s.i.g. and 380° F. while vessel 36 is operated at about 400 p.s.i.g. and at 400° F., the holding time in each of the vessels being about 20 to 30 minutes. It is preferred that a substantial amount of the oxidation occur in each vessel and that the acetic acid concentration in each vessel be at least about 80 percent by weight, maximum yields being obtained if water is removed from the final reactor substantially as fast as it is formed. Some water and solvent is of course recycled from each of the latter reactors to the next preceding reactor along with the gas stream and a portion of the water of reaction is ultimately removed from the oxidizers through line 26 along with a certain amount of acetic acid which is recovered in tower 27 as hereinabove described.

Whether the oxidation is effected in one, two or three vessels, the oxidized product stream withdrawn through line 31 (or 31′) is passed through pressure-reducing valve 43 or a metering pump or transfer means into the first stage crystallizer 44 which in this case is operated at 75 p.s.i.g. and 350° F. while the contents of vessel 44 are constantly agitated by impeller-mixer 44a. The vapors withdrawn through line 45 are partially condensed in cooler 46 and introduced into receiver 47. Vapors from receiver 47 are introduced by lines 48 and 26 to water scrubber 27 for recovery of solvent. If desired, condensate may be returned to vessel 44 by line 49 but this line is usually closed and the condensate is discharged by lines 50 and 51 to solvent still 52. Condensate from line 25 may likewise be introduced through line 51 to still 52.

In vessel 44 the defined conditions effect crystallization of terephthalic acid and the seeding or nucleating of isophthalic acid; a holding time in this vessel of about an hour or more may be required to obtain crystals of desired size and separability. Slurry from vessel 44 is introduced through pressure reducing valve, metering pump or other transfer means 53 and line 54 to crystallizing vessel 55 which is operated in this case at about 2 p.s.i.g.

and at a temperature of about 240 to 250° F. for crystallizing the isophthalic acid while substantially avoiding or minimizing the crystallization of phthalic acid. The holding time in vessel 55 may be about 1 hour or 2 hours. Vapors withdrawn through line 56 are partially condensed in cooler 57 and introduced into receiver 58 from which condensate is passed by pump 59, line 60 and line 51 to still 52. Here again, a part of the condensate may be returned to the crystallizer by line 61 although this is usually undesirable. Uncondensed gases from receiver 58 are introduced by line 62 and line 26 to scrubber 27.

The slurry from vessel 55 which may be maintained in suspension by suitable stirring means 63, is introduced by pump 64 and line 65 to separator 66 which may be a filter or centrifuge system. When flow to the separator is stopped, slurry may be returned to vessel 55 by line 67. The crystals separated from mother liquor by filtration or centrifuging are then washed with water introduced by line 68 for dissolving any small phthalic acid crystals which may be present in the isophthalic and terephthalic acid crystals, the latter being removed from the system through line 69 to a suitable separation and/or purification system. Wash water from the washing step is returned by pump 70 through line 71, heater 72, and line 54 to crystallizer 55.

The mother liquor withdrawn from separator 66 by line 73 is introduced into a mother liquor recovery system 74 wherein the components of the mother liquor are separated from each other chiefly by fractional distillation. The aqueous solvent may be returned by line 75 to line 60 and thence to still 52. Benzoic acid may be separated by line 76 and phthalic acid by line 77. Toluic acid and dicarboxylic acids may be returned by line 78 to line 12 for return to oxidizing vessel 11. Other components of the mother liquor may be discarded through line 79.

From the foregoing it will be observed that all inert gases which are vented from the system are first scrubbed with water for recovering solvent which in this example is acetic acid. Aqueous acetic acid from various parts of the system is accumulated and introduced by line 51 into still 52 which is provided with a suitable heater or reboiler at its base and which effects removal of substantially all water and any hydrocarbons from anhydrous solvent, the latter being discharged by line 80 to storage tank 81 from which solvent is removed by pump 82 for introduction by line 12 to the oxidizing zone. If the make-up solvent contains water or other impurities removable as an overhead stream, such make-up solvent is preferably introduced by line 83 into still 52 instead of being introduced to the system by line 13. Water vapors and azeotroped hydrocarbons are withdrawn from the top of still 52 through line 84, cooled in condenser 85 and collected in receiver 86. Condensed hydrocarbons flow over weir 87 and are withdrawn through line 88. Water may be pumped from the receiver by pump 89 and that portion which is not required as reflux via line 90 is discharged from the system.

While the foregoing example has been described in considerable detail with respect to the oxidation of a particular charging stock, it should be understood that the invention is applicable to a large number of different charging stocks and for the production of a large number of polycarboxylic acid products. If a single xylene is employed as a charge instead of mixed xylenes, the crystallization technique may be simplified since the particular system hereinabove described is designed for effecting crystallization of isophthalic acid and terephthalic acid, in a form which is readily separable from mother liquor and which enables subsequent separation and recovery of these individual dicarboxylic acids in substantially pure form. Examples of oxidizable substituted aromatic hydrocarbons and the acids obtainable therefrom are as follows:

| Methylbenzene | Benzoic. |
| 1,3-dimethylbenzene | Phthalic. |
| 1,3-dimethylbenzene | Isophthalic. |
| 1,4-dimethylbenzene | Terephthalic. |
| 1,2,3-trimethylbenzene | Hemimellitic. |
| 1,2,4-trimethylbenzene | Trimellitic. |
| 1,3,5-trimethylbenzene | Trimesic. |
| 1,2,3,4-tetramethylbenzene | Prehnitic. |
| 1,2,4,5-tetramethylbenzene | Pyromellitic. |
| 1,2,3,5-tetramethylbenzene | Mellophanic. |
| Pentamethylbenzene | Benzenepentacarboxylic. |
| Hexamethylbenzene | Mellitic. |
| p-Diisipropylbenzene | Terephthalic. |
| m-Diisopropylbenzene | Isophthalic. |
| 1,3,5-triisopropylbenzene | Trimesic. |
| 1,3-dimethyl-5-ethylbenzene | Trimesic. |
| 1-methylnaphthalene | α-Naphthoic acid. |
| 2-methylnaphthalene | β-Naphthoic acid. |

While crystallization is preferably effected by removal of vapors for effecting concentration and/or temperature control, the crystallization may be effected in a scraped surface exchanger provided that is constructed of a material which will not be corroded or cause product contamination; the use of a scraped surface exchanger offers the advantages of close cooling rate control at nucleation temperatures, cooling rate control for obtaining desired crystal sizes and diluent addition as a crystal control expedient, etc. Alternative operating techniques, steps and conditions will be apparent from the foregoing description to those skilled in the art.

We claim:

1. In a process for producing aromatic polycarboxylic acids by oxidizing polyalkyl aromatic hydrocarbons containing 1 to 3 carbon atoms in alkyl groups with molecular oxygen in the presence of a catalyst comprising in conjoint presence bromine and a heavy metal oxidation catalyst and in the presence of a liquid phase of saturated monocarboxylic acid containing 2 to 5 carbon atoms per molecule at a temperature in the range of from 320 to 440° F., a pressure in the range of from 50 to 500 p.s.i. for a time of from 0.1 to 3 hours, the improved method of operation which comprises effecting said oxidation in a continuous staged countercurrent reaction system containing at least two oxidation zone stages, introducing an amount of air in the final oxidation zone stage in an amount providing an excess of oxygen for oxidation in said final oxidation zone stage but less than required to give off-gases containing more than 8 volume percent oxygen, and introducing oxygen-containing off-gases from said final oxidation zone stage to a preceding oxidation zone stage together with an amount of air which will give less than 8 volume percent oxygen in the off-gases from said preceding stage.

2. The method of continuously and stage-countercurrently oxidizing as charging stock polyalkyl aromatic hydrocarbon containing 1 to 3 carbon atoms in the alkyl groups to form at least one aromatic polycarboxylic acid product, which method comprises introducing 1 volume of charging stock and about 1 to 5 volumes of saturated mono-basic aliphatic acid reaction medium having 2 to 5 carbon atoms per molecule, a catalyst comprising in conjoint presence bromine and a heavy metal oxidation catalyst into a first oxidation zone, introducing at the base of said first oxidation zone gas and vapors from a second oxidation zone together with a sufficient amount of added air to effect a substantial amount of oxidation in said first zone and to give an off-gas therefrom containing from about 0 to 5 volume percent of uncombined oxygen, operating said first zone under a pressure of about 50 to 300 p.s.i. at a temperature in the range of 320 to 420° F. for a contact time of about .1 to 1.0 hour, pumping oxidation zone effluent from the first zone to a second oxidation zone, introducing molecular oxygen-containing gas at the base of the second oxidation zone which has a higher oxygen content than that introduced into the first oxidation zone but limited to provide an oxygen concentration in off-gases leaving the second oxidation zone to an amount in the range of about .1 to 8 volume percent, said second oxidation zone being operated at a pressure in the range of 100 to 500 p.s.i. at a temperature in the range of about 340 to 440° F. and with a charging stock holding time in the range of .1 to 1.5 hours.

3. The method of claim 2 which includes the steps of maintaining said second oxidation zone at a pressure in the range of 100–400 p.s.i. and at a temperature in the range of 340–420° F. pumping oxidation product effluent from the second oxidation to a third oxidation zone which is maintained at a higher temperature and pressure than the second oxidation zone but with a temperature in the range of 360–440° F. and pressure in the range of 200–500 p.s.i., introducing air at the base of the third oxidation zone at a rate to give an oxygen content in the off-gas from the third oxidation zone which does not exceed about 8 volume percent and passing the off-gas from the third oxidation zone to the base of the second oxidation zone.

4. In the process of converting a charging stock containing isomeric polyalkyl aromatic hydrocarbons containing 1 to 3 carbon atoms in the alkyl groups into a plurality of aromatic polycarboxylic acid products wherein said charging stock is intimately contacted with molecular oxygen-containing gas in the presence of a catalyst comprising in conjoint presence bromine and a heavy metal oxidation catalyst and in the presence as a solvent a saturated aliphatic monocarboxylic acid having 2 to 5 carbon atoms in the molecule while the oxidizing zone is maintained at temperature in the range of about 320 to 440° F. under pressure in the range of 50 to 500 p.s.i with a charging stock holding time in the range of about .1 to 3 hours, the improved method of operation which comprises continuously withdrawing oxygen-depleted gas and vapors from the oxidizing zone, controlling the introduction of oxygen-containing gas to keep the oxygen content of the oxygen-depleted gas below 8 volume percent, condensing at least a part of said vapors and separating condensate from an uncondensed gasiform stream, passing a carboxylic acid product stream from the oxidation zone through at least one crystallizing zone, removing vapors from the carboxylic acid product in said crystallizing zone, cooling said last named vapors to separate condensate from a gasiform stream, recovering solvent from the gasiform streams by water scrubbing to obtain at least one solvent-containing aqueous stream, distilling said condensates and said solvent-containing aqueous stream for recovering solvent therefrom whereby the solvent may be returned to the system in substantially anhydrous form, separating a slurry removed from the crystallizing zone into a crystal fraction and mother liquor, and separating mother liquor by distillation into a solvent fraction, a fraction containing an aromatic monocarboxylic acid and a fraction containing an aromatic dicarboxylic acid.

5. The method of claim 4 wherein the charging stock is a mixture of xylenes and the solvent is acetic acid and which includes the step of maintaining the crystallizing zone at a temperature of about 240 to 250° F. at a slight superatmospheric pressure.

6. The method of claim 4 which includes the steps of withdrawing vapors from separated mother liquor, cooling said vapors to obtain a gasiform stream which is combined with the other gasiform streams and a solvent-rich aqueous stream which is combined with the other solvent-rich aqueous streams.

References Cited in the file of this patent

UNITED STATES PATENTS

| | | |
|---|---|---|
| 2,479,067 | Gresham | Aug. 16, 1949 |
| 2,552,267 | Emerson et al. | May 8, 1951 |
| 2,734,914 | McKinnis | Feb. 14, 1956 |
| 2,788,367 | Bills et al. | Apr. 9, 1957 |
| 2,833,816 | Saffer et al. | May 6, 1958 |
| 2,887,511 | Wasley | May 19, 1959 |

FOREIGN PATENTS

| | | |
|---|---|---|
| 666,709 | Great Britain | Feb. 20, 1952 |